Nov. 16, 1926.

N. TRBOJEVICH

GEAR CUTTER

Original Filed Jan. 21, 1921   3 Sheets—Sheet 1

Inventor
Nikola Trbojevich

By
Attorney

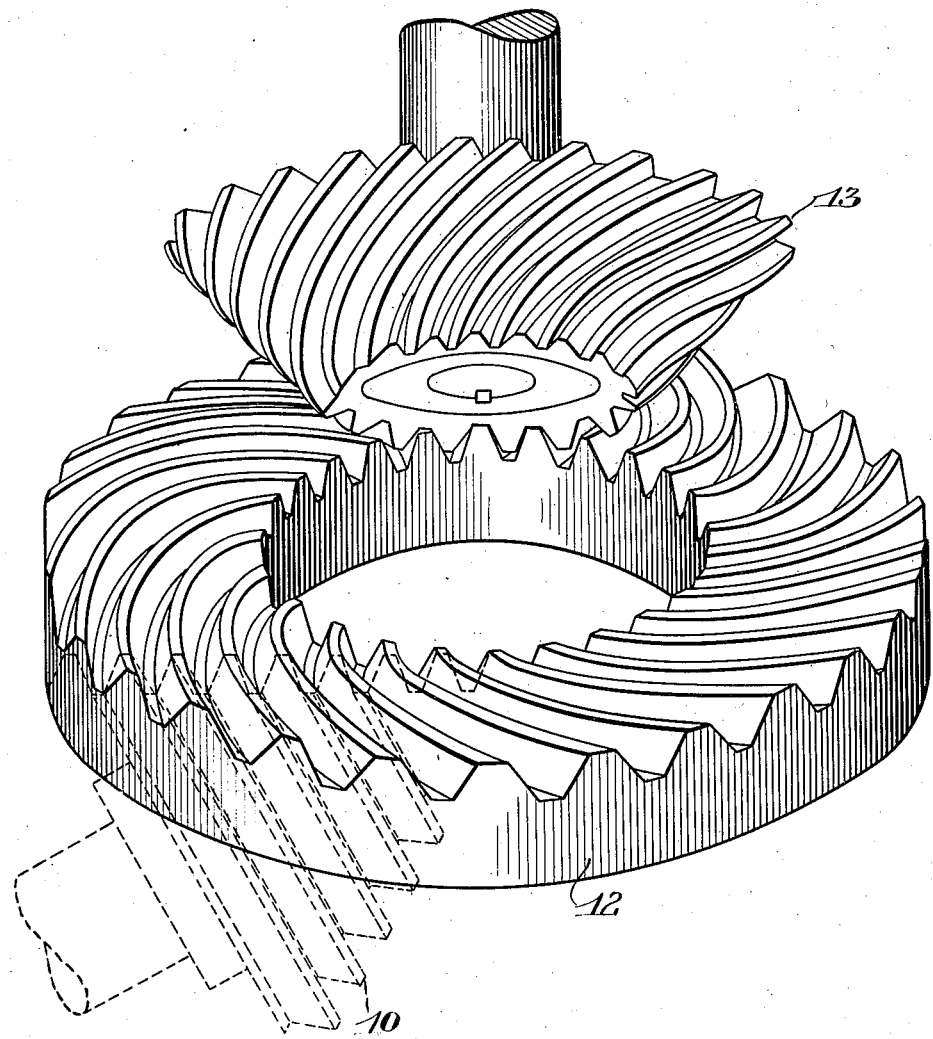

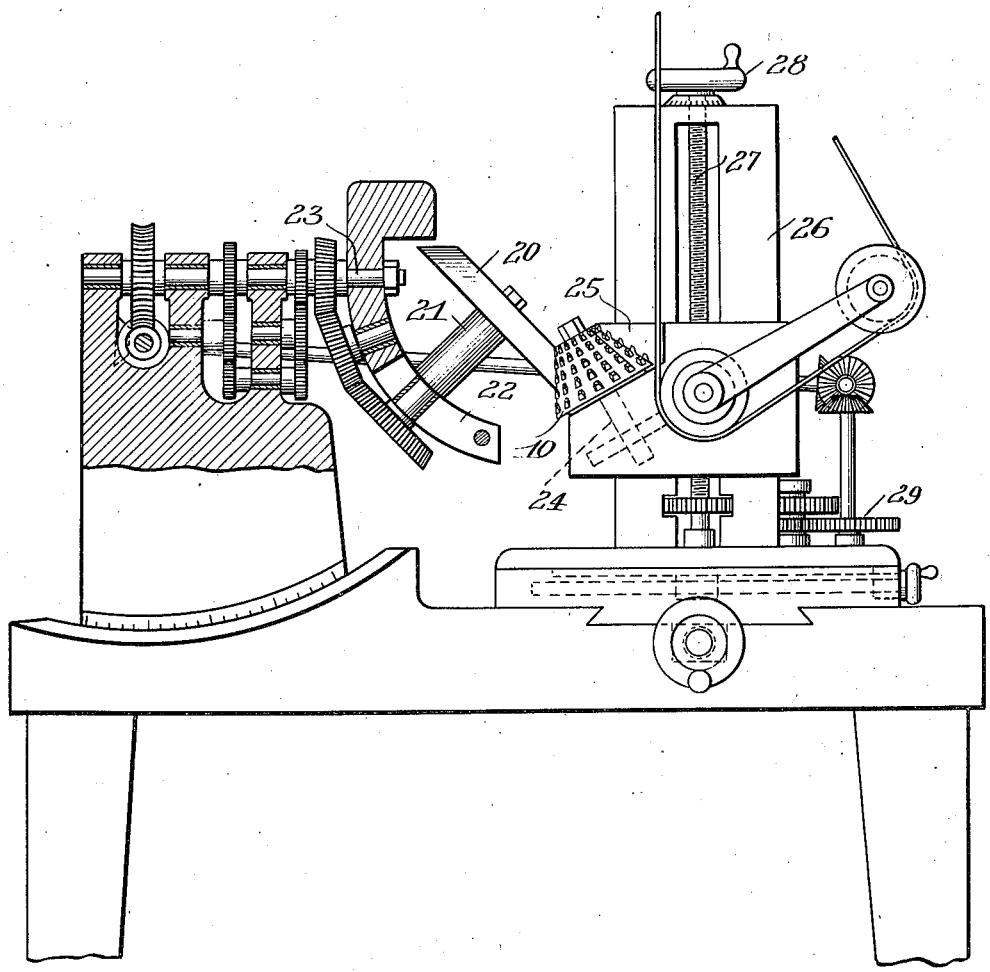

Patented Nov. 16, 1926.

1,607,218

UNITED STATES PATENT OFFICE.

NIKOLA TRBOJEVICH, OF HIGHLAND PARK, MICHIGAN, ASSIGNOR TO GLEASON WORKS, OF ROCHESTER, NEW YORK, A CORPORATION OF NEW YORK.

GEAR CUTTER.

Original application filed January 21, 1921, Serial No. 438,831. Divided and this application filed April 20, 1925. Serial No. 24,445.

My invention relates to an improved tool for producing gears, this application being a division of my application for a method of producing gears, Serial No. 438,831, filed January 21, 1921. This invention relates in particular to a tool for producing curved teeth upon conical gear blanks.

One of the objects of the invention is the provision of a tool which will be easy to manufacture and can readily be kept in working condition. Other objects will appear from the specification hereinafter and from the appended claims.

For the purpose of clearly describing my invention, reference is had to the accompanying drawings, in which I have illustrated certain embodiments of my invention, it being understood however that the invention is capable of various modifications within its scope and the limits of the appended claims.

In the drawings:

Fig. 3 is a diagrammatic view explanatory of the theory upon which the application of this tool to the production of curved tooth bevel gears is based.

Fig. 4 is a fragmentary sectional view in a plane tangent to the pitch surface of the tool, showing one of the cutting members in engagement with the blank.

Figs. 5 and 6 are respectively, diagrammatic views, illustrating the relative change of position of the tool and gear blank to generate right and left handed curve tooth bevel gears.

Fig. 7 is a side elevation of one form of machine upon which my tool may be employed for the production of curved tooth bevel gears.

Figure 1:
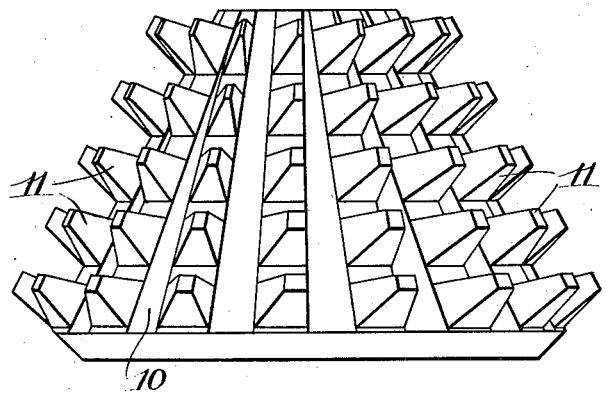
Fig. 1 is a side elevation of the preferred form of tool.
Figure 2:
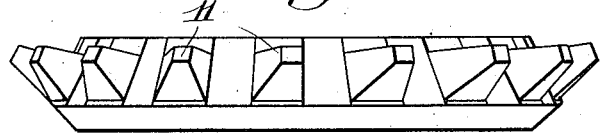
Fig. 2 is a modification thereof.
Figure 2:
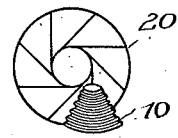
Figure 2:
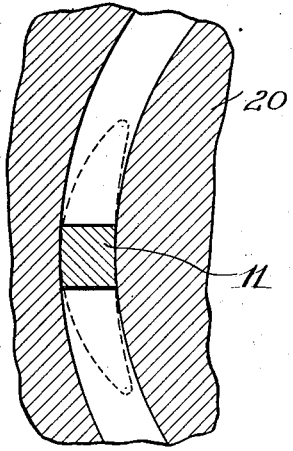
Figure 2:
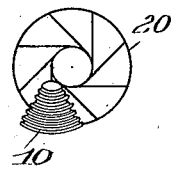

In the form selected to illustrate my invention the tool consists of a truncated conical body 10 which is provided with a plurality of corresponding teeth or cutting sections 11, arranged in a continuous thread or threads circumferentially of said body. The threads are equi-distantly spaced longitudinally of the tool axis and there are, preferably, the same number of teeth in each concentric circumferential series or thread. The teeth of each series or thread follow, preferably, each other in the same path during the rotation of the tool and corresponding teeth of each thread are preferably so angularly displaced with reference to the teeth of the same thread or series that the corresponding circumferentially located teeth will align along the generatrices of the pitch surface of the conical body.

When finished, therefore, the cutting sections for teeth of the tool in the same longitudinal section or along the generatrix of the pitch surface of the tool mesh perfectly with a rack of constant pitch. The cutting sections are, generally speaking, of a deformed truncated pyramidal shape and the edges of teeth following in a circumferential direction each longitudinal flute or gash are sharpened and the teeth or cutting sections are so relieved that they possess cutting clearance in planes perpendicular to generatrices of the pitch surface of the tool. The effective cutting profiles of the cutting sections are preferably identical.

Fig. 3 of the drawings illustrates the theory upon which this tool is applied to the production of curved tooth bevel gears. In this figure 12 represents a basic crown gear, the teeth of which are constructed so as to give them the desired curvature in the plane of the crown gear which is also the plane of the development of the bevel gears which have as their basis this crown gear. If a gear blank 13 of suitable plastic material were brought into contact with this crown gear and were rolled about the axis of this crown gear, i. e., about the apex of the blank, teeth would be generated upon the blank which would perfectly mesh with the crown gear. If now, a tool 10 is chosen which can, as shown, along a longitudinal section perfectly mesh with the teeth of the crown gear across the face thereof, this tool may be employed to represent the basic crown gear and may be used to produce bevel gears similar to the gear produced from the plastic blank 13. The method of production of such gears is more fully described in the parent application above referred to and consists briefly in rotating the tool about its axis while in engagement with the blank which is given a simultaneous rotation about its own axis while being swung relatively to the tool about the axis of the basic crown gear.

Fig. 4 shows the tool and gear blank in cutting engagement, this section being taken in the plane of the crown gear or a plane tangent to the pitch surfaces of both tool and blank. As indicated by the dotted lines in this figure the effective cutting portions of the tool are concave on the side facing the cone apex and convex on the other. In other words, the circumferential rib, which is gashed to form the cutting portions, is of general crescent shape in a plane tangent to the pitch cone of the tool.

One form of machine for producing bevel gears with my tool is shown in Fig. 7, it being understood, however, that my tool is not restricted to use on this machine alone. In this machine the blank 20 is securely mounted on a spindle 21, which is journaled in an arm 22 that projects from one end of the work arbor 23. The gear blank is carried in an orbit concentric to the axis of the work arbor and is made to rotate on its own axis by a train of gears, as more particularly described in my application, Serial No. 431,890, filed December 20, 1920, that impart the motion of the work arbor to the blank spindle. Once during every cycle of its movement about the axis of the work arbor, the gear blank comes transversely into rolling contact with a rotating tool 10. The rotation of the gear blank on its axis is preferably controlled by a master gear, as described in the last mentioned application, which is one of the train of gears that imparts the motion of the work arbor to the spindle upon which the blank is mounted. This master gear has a number of teeth prime to the number of teeth of the crown gear represented by the tool. The result is that a new tooth section of the gear blank will come into engagement with the rotary tool once during every cycle of movement of the blank about the work arbor.

The rotary tool 10 is mounted on one end of an arbor 24 journaled in a suitably constructed vertically adjustable head 25 and the axis of this arbor is so inclined that the pitch surfaces of the tool and blank are tangent to a common plane. The head 25 is slidable vertically on a column 26 and can be adjusted vertically thereon by means of the screw 27, either through the handwheel 28 or the gears 29 which may be driven from any suitable source of power, as described in the application last referred to. The usual horizontal adjustments are provided to bring the tool and the blank into cutting engagement.

While I have described my invention in connection with the production of a particular type of gear it is to be understood that the structure or use of the tool may be modified or varied without departing from the intent of the invention or the scope of the following claims, and that this application is intended to cover any adaptations or embodiments, following, in general, the principles of the invention and including such departures from the present disclosure as come within known or customary practice in gear cutting and may be applied to the essential features hereinbefore set forth and as fall within the limits of the appended claims.

Having thus described my invention, what I claim is:

1. A gear cutting tool comprising a truncated cone-shaped body having a plurality of cutting teeth arranged thereon, said teeth being relieved to provide cutting edges which are aligned along generatrices of the pitch surface of the cone and form a series of rack elements of constant pitch.

2. A gear cutting tool comprising a truncated cone-shaped body having a plurality of cutting teeth arranged thereon, said teeth being spaced apart equal distances along generatrices of the pitch surface of the cone to engage with separate teeth of the blank to be cut and being relieved in a circumferential direction to form cutting edges which are aligned along said generatrices.

3. A gear cutting tool comprising a truncated cone-shaped body having a plurality of cutting teeth arranged thereon, said teeth being relieved in a circumferential direction to form cutting edges and being spaced apart equal distances along generatrices of the pitch surface of the cone to engage with separate teeth of the blank to be cut, the profiles of the cutting faces of said teeth being identical.

4. A gear cutting tool comprising a truncated cone-shaped body having a plurality of cutting teeth of general frusto-pyramidal shape arranged thereon, said teeth being spaced apart equal distances along generatrices of the pitch surface of the cone to engage separate teeth of the blank to be cut and being relieved in a circumferential direction to form cutting edges which are aligned along said generatrices.

5. A gear cutting tool comprising a truncated cone-shaped body provided with a plurality of equi-distantly spaced circumferentially arranged series of cutting teeth, corresponding teeth of each series being so angularly disposed with reference to the teeth of the same series that the corresponding circumferentially located teeth are aligned along the generatrices of the pitch surface of the cone, said teeth being relieved in a circumferential direction.

6. A gear cutting tool comprising a truncated cone-shaped body provided with a plurality of equi-distantly spaced circumferentially arranged series of cutting teeth, corresponding teeth of each series being so angularly disposed with reference to the teeth of the same series that the corresponding circumferentially located teeth are aligned along the generatrices of the pitch surface of the cone, said teeth being relieved in a circumferential direction and having straight cutting edges.

7. A gear cutting tool comprising a truncated cone-shaped body provided with a plurality of equi-distantly spaced circumferentially arranged series of cutting teeth of general frusto-pyramidal shape, corresponding teeth of each series being so angularly disposed with reference to the teeth of the same series that the corresponding circumferentially located teeth are aligned along the generatrices of the pitch surface of the cone, said teeth being relieved in a circumferential direction.

8. A gear cutting tool formed by gashing a rib, which is wrapped on a truncated cone-shaped body, along generatrices of the pitch surface of the cone to form cutting teeth, and relieving said teeth to form cutting edges which lie along said generatrices, said rib in a plane tangent to the pitch surface of the cone being of general crescent shape.

9. A gear cutting tool formed by gashing a rib, which is wrapped on a truncated cone-shaped body, longitudinally of the cone to form cutting teeth and relieving said teeth to form cutting edges, said rib in a plane tangent to the pitch surface of the cone being of general crescent shape.

NIKOLA TRBOJEVICH.